United States Patent
Qureshi (10) Patent No.: US 9,223,458 B1
(45) Date of Patent: Dec. 29, 2015

(54) TECHNIQUES FOR TRANSITIONING BETWEEN PLAYBACK OF MEDIA FILES

(71) Applicant: Amazon Technologies, Inc., Reno, NV (US)

(72) Inventor: Aneeb Naveed Qureshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 13/848,612

(22) Filed: Mar. 21, 2013

(51) Int. Cl.
```
G06F 3/00       (2006.01)
G06F 3/048      (2013.01)
G06F 3/0481     (2013.01)
G11B 27/34      (2006.01)
G06F 3/16       (2006.01)
```

(52) U.S. Cl.
CPC .............. *G06F 3/048* (2013.01); *G06F 3/0481* (2013.01); *G06F 3/16* (2013.01); *G11B 27/34* (2013.01)

(58) Field of Classification Search
USPC .......................................... 715/716, 719, 727
See application file for complete search history.

(56) References Cited

U.S. PATENT DOCUMENTS

| | | | |
|---|---|---|---|
| 6,990,453 B2 | 1/2006 | Wang et al. | |
| 7,788,279 B2 | 8/2010 | Mohajer et al. | |
| 8,699,862 B1* | 4/2014 | Sharifi et al. | 386/338 |
| 2012/0046954 A1* | 2/2012 | Lindahl et al. | 704/500 |
| 2013/0074133 A1* | 3/2013 | Hwang et al. | 725/93 |

OTHER PUBLICATIONS

Nambi K Madhi et al.; Automatic measusrement of audio/video synchronization in digital media playback; Feb. 17, 2011; ip.com Journal, pp. 1-6.*
Jorge Jaramillo et al.; Multiple Media Playback Synchronization; Jun. 5, 2012; ip.com Journal; pp. 1-4.*
Wang, Avery Li-Chun (Oct. 2003) "An Industrial-Strength Audio Search Algorithm", *Shazam Entertainment*, Ltd., 7 pages.

* cited by examiner

*Primary Examiner* — Tam Tran
(74) *Attorney, Agent, or Firm* — Weaver Austin Villeneuve & Sampson LLP (57) ABSTRACT

Methods and apparatus are described for identifying a media file selected for playback by a user, determining whether an alternate media file is available that includes at least some of the same content as the first media file, and transitioning between playback of the first media file and the alternate media file.

21 Claims, 4 Drawing Sheets

FIG. 4 ically noted that implementations are contemplated in which the transition facilitated is not necessarily from an audio file to a video file. That is, transitions may be facilitated from audio files to other audio files, video files to audio files, or video files to video files. The scope of the invention should therefore not be limited to the class of implementations described in this example.
TECHNIQUES FOR TRANSITIONING BETWEEN PLAYBACK OF MEDIA FILES

BACKGROUND

Consumers of digital media have an ever-increasing array of options for consuming digital content, both in terms of the number of content providers, as well as the variety of channels through which content may be received. Content providers are becoming increasingly sophisticated and effective at providing access to vast amounts of content on demand, as well as identifying specific content that might be of interest to individual consumers. Success in the marketplace will depend in part on the ability of content providers to continue to provide new and convenient mechanisms for consumers to discover and consume digital content.

DETAILED DESCRIPTION

This disclosure describes techniques for identifying a media file selected for playback, determining whether an alternate media file is available that includes at least some of the same content as the first media file, and transitioning between playback of the first media file and the alternate media file. For at least some implementations, the transition may be relatively seamless so that the transition is not disruptive to the user's experience. For example, if the user selects a music track for playback in a media player, an option could be presented to the user to view the music video for the selected track. If the user elects to view the video, the transition to playback of the video occurs such that the audio component of the video picks up where the original audio track leaves off.

For example, a Kindle Fire user might select the audio track "Little Lion Man" by Mumford & Sons for playback using the Amazon Cloud Player. Once the audio track and the corresponding music video are identified, the Cloud Player presents an option to the user to transition from playback of the song to playback of the video in a way that appears seamless from the user's point of view. The Cloud Player might also present the option to transition back to the audio track at any point during playback of the music video.

Figure 1:
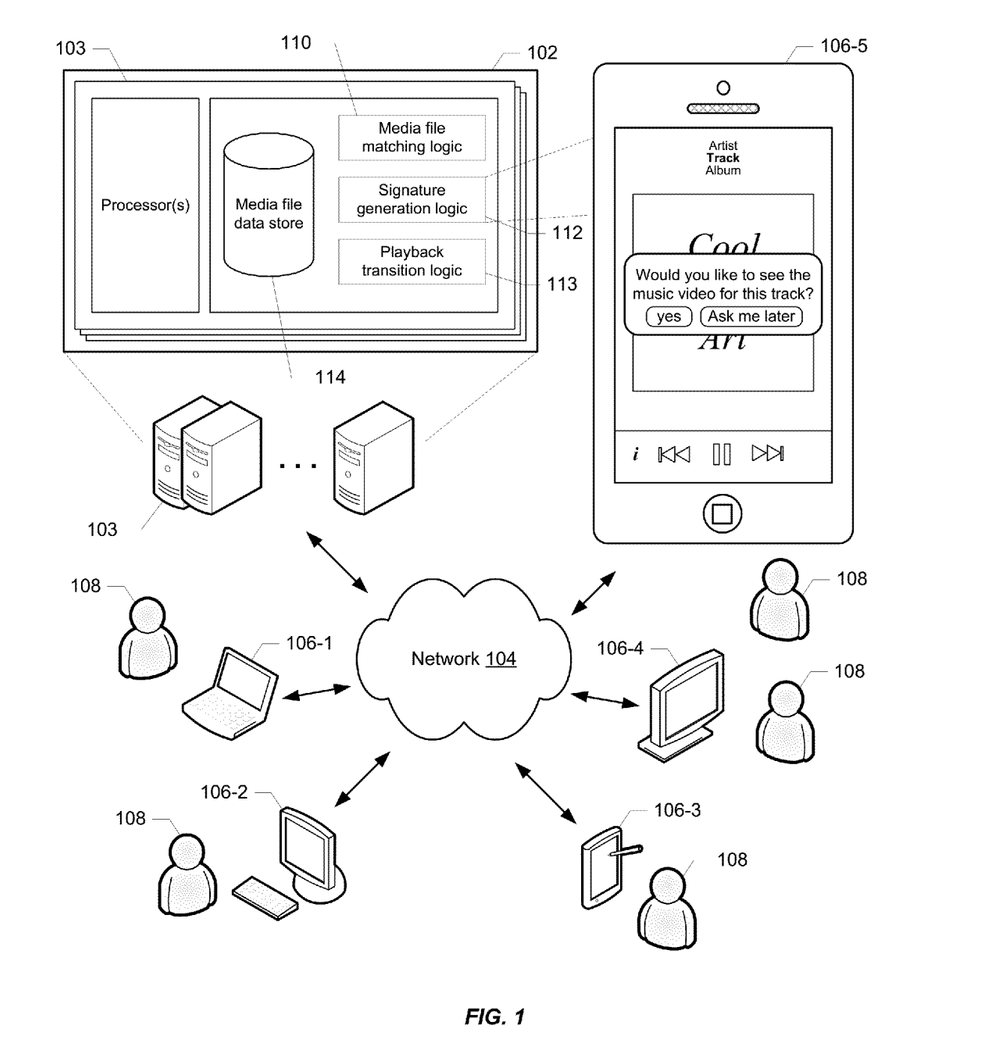
FIG. 1 illustrates an example of a computing environment in which digital content may be delivered as described herein.

FIG. 1 illustrates an example of a computing environment in which content may be delivered by a content service 102 via network 104 to a variety of client devices (106-1 through 106-5) associated with users 108. Content service 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by content service 102. Such device may include, for example, mobile devices (e.g., cell phones, smart phones, and tablets), personal computers (e.g., laptops and desktops), set top boxes (e.g., for cable and satellite systems), smart televisions, gaming consoles, etc. More generally, at least some of the examples described herein contemplate various distributed computing implementations. The term "distributed computing" refers to computing models for enabling ubiquitous, convenient, on-demand network access to a shared pool of computing resources (e.g., networks, servers, storage, applications, and services).

It should also be noted that, despite references to particular computing paradigms and software tools herein, the computer program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

Figure 2:
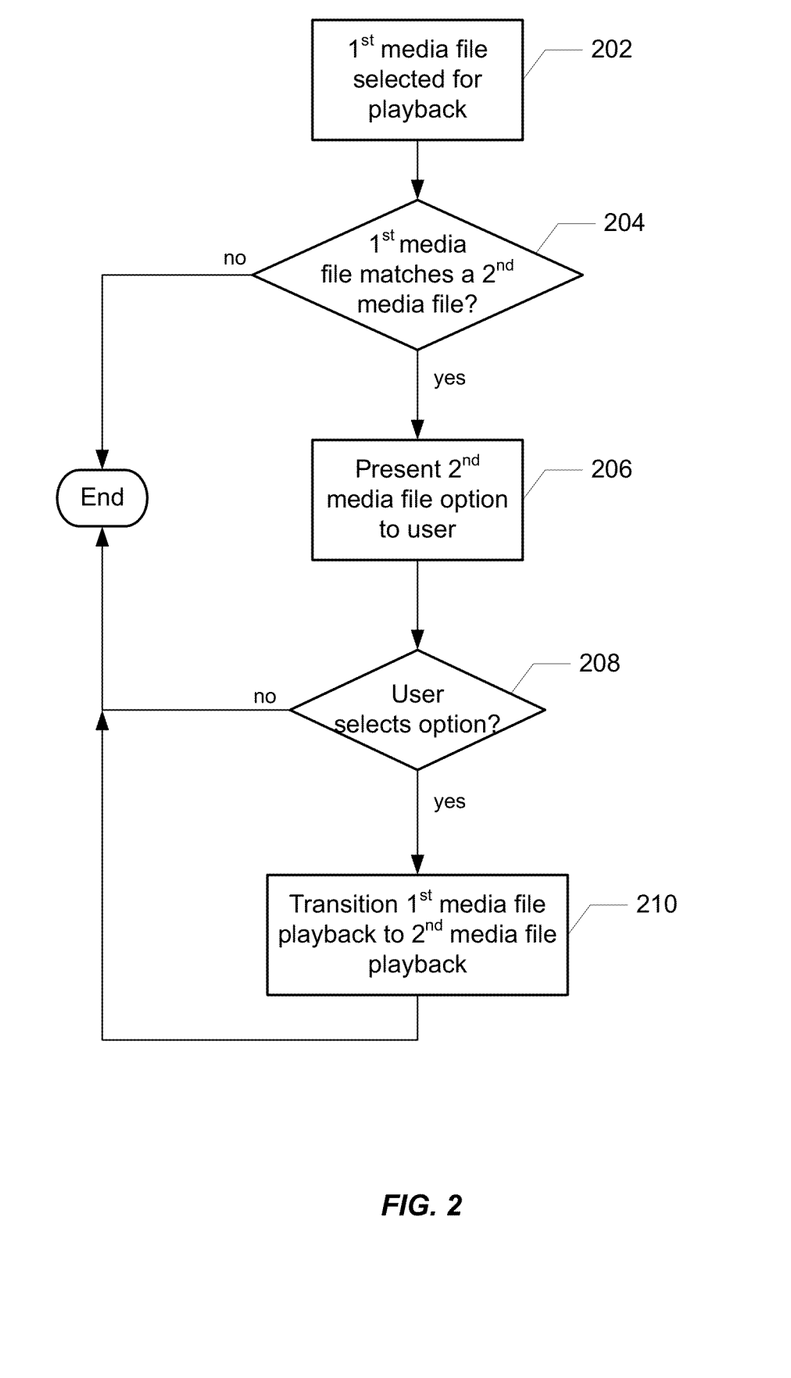
FIG. 2 illustrates an example of a process for transitioning between playback of media files.

A specific implementation will now be described with reference to the flow diagram of FIG. 2 and the computing environment of FIG. 1. In the depicted implementation, a user is provided with an opportunity to watch a music video that corresponds to a music track to which the user is listening or that the user has selected for playback. The process may be triggered by the selection of the audio file (202) (the first media file of FIG. 2) such as, for example, when the user selects a music track using a media player interface on a smart phone. As will be understood, the selection of the audio file may be effected by the user directly (e.g., selection of an interface object directly corresponding to the audio file), or indirectly (e.g., selection of a curated Internet radio station, an album, or play list that results in playback of a track selected by an application). It should also be noted that implementations are contemplated in which the transition facilitated is not necessarily from an audio file to a video file. That is, transitions may be facilitated from audio files to other audio files, video files to audio files, or video files to video files. The scope of the invention should therefore not be limited to the class of implementations described in this example.

Referring again to FIGS. 1 and 2, a determination is made (e.g., by media file matching logic 110) as to whether the selected audio file maps to a corresponding video file (204) (the second media file of FIG. 2). As will be discussed, this may be achieved by a real-time comparison of digital signatures for the respective files (e.g., as generated by signature generation logic 112), or from existing mappings between audio and video files based on previous comparisons of digital signatures. If a matching video is found, a notification is provided to the user that there is an available music video corresponding to the selected audio file (206). This might take the form, for example, of a pop-up window as shown in the interface of device 106-5 in FIG. 1. Alternate forms of providing such a notification may also be employed. For example, a text could be sent to the user's smart phone on which the audio file is playing. In another example, the notification may be integrated with the media player as, for example, a selectable icon which appears next to the interface controls when the option is available. Other suitable alternatives will be apparent to those of skill in the art.

If the user elects to watch the video, e.g., by selecting an object associated with the notification (208), e.g., a button or link, a transition is made from playback of the audio file to playback of the video file (210), e.g., by playback transition logic 113. According to one class of implementations, playback of the video file begins at a point in the playback duration of the video's audio component that matches a corresponding point in the playback duration of the audio file at which playback of the audio file ends. Depending on the relative levels of quality of the files, this may be done so that the user does not perceive the switch from the acoustic energy generated by the originally selected music track and that generated by the audio component of the music video.

Alternatively, where the relative quality of the audio is perceptibly different, or where the transition point matching is not sufficiently precise, a variety of techniques may be employed to mitigate any disruption associated with the transition. For example, the volume associated with the original audio could be faded out and the audio associated with the video could be faded in to make for a smoother transition.

A wide variety of techniques may be employed to generate digital signatures suitable for use with implementations as described herein. Suitable techniques generate temporally localized representations of the original audio information in an unknown media file that may be compared to similarly generated representations of audio information in known media files. Such techniques effectively compress the audio to make the comparison more efficient. For example, a suitable technique might capture the frequency content or spectral characteristics of one or more audio samples and then compress or encode that information, or otherwise extract a suitable feature set, to generate a set of temporally localized data points. It should be noted that the resulting data points may or may not contain sufficient information to allow recovery of any of the frequency content or spectral characteristics of the audio samples from which they are derived.

Such a technique (e.g., as embodied by signature generation logic 112) is applied to the audio file selected by the user as well the audio components of a library of video files (e.g., represented by media file data store 114) to generate corresponding digital signatures for each file. A matching video file can be identified as corresponding to the audio file by a comparison of the digital signatures. In addition and as will be discussed, one or more transition points in matching files can be identified from their respective digital signatures such that a transition from playback of the audio file to playback of the video file can be done in a manner which substantially eliminates or mitigates any disruption of the user's experience.

Media file data store 114 (which may represent one or more data stores in a distributed system) may store a variety of media files (e.g., audio and video files) for delivery to users. According to various implementations, media files may be stored by and under control of one or multiple content services. Media file data store 114 may also include metadata for corresponding media files, digital signatures for corresponding media files, and/or playback transition information for corresponding media files. Alternatively, any or all of these data may be stored in other data stores separate from media file data store 114. Further, this information may or may not be stored by or under control of the content provider.

According to a particular implementation, digital signatures are generated from the audio samples of a media file by calculating hash values using one or more audio samples associated with spectrogram peaks, resulting in a constellation of temporally localized data points as described, for example, in *An Industrial-Strength Audio Search Algorithm*, Avery Li-Chun Wang, October 2003, the entirety of which is incorporated herein by reference for all purposes. Suitable techniques for generating and comparing digital signatures are also described, for example, in U.S. Pat. No. 6,990,453 entitled System and methods for recognizing sound and music signals in high noise and distortion issued on Jan. 24, 2006, and U.S. Pat. No. 7,788,279 entitled System and method for storing and retrieving non-text-based information issued on Aug. 31, 2010, the entire disclosures of both of which are incorporated herein by reference for all purposes. A variety of other suitable techniques are known or within the capabilities of those skilled in the art.

Digital signatures of media files may be maintained as a library (e.g., in media file data store 114 or a separate data store) as media files are accumulated. Matching media files can also be mapped to each other in the data store using the digital signatures as the media files are accumulated. For example, an audio file for a particular music track can be stored with a pointer to a matching video file based on a successful match between their respective digital signatures. This can allow for more efficient discovery and presentation of the video file in response to identification of an audio file selected for playback by a user that does not require a comparison of digital signatures in real time.

Alternatively, the digital signature of a media file can be captured in real time and compared in real time to the digital signatures in an existing library of media files to find a match. In such cases, the digital signature of the unknown file may reflect only a portion of the playback, e.g., the first few seconds. As will be understood, such partial signatures may affect the confidence level of any match to the digital signature of a known media file, as well as the identification of an appropriate transition point.

It should also be noted that the digital signature of the unknown media file may be generated at the user device, e.g., with a local application that captures the audio as it is played. Such a local application may be part of or associated with the media player that is playing the media file, or may even be a separate application operating on the user device. Alternatively, the digital signature of the unknown media file may be generated remotely from the user device, e.g., at the back end from audio samples transmitted from the client device during playback, or from a copy of the audio file in memory accessible to the back end. Thus, it will be understood that some or all of signature generation logic 112 of FIG. 1 may reside on either or both of client device 106-5 and content service 102 (as indicated by the dashed lines in FIG. 1).

Figure 3:
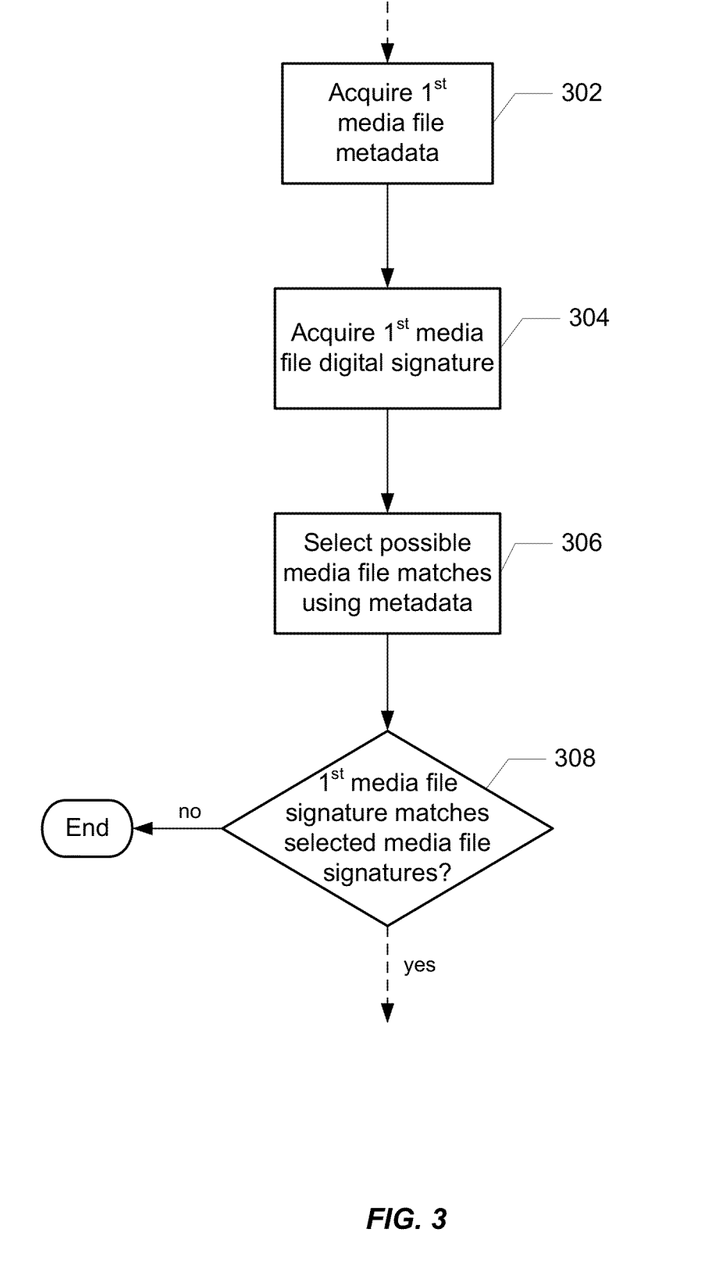
FIG. 3 illustrates an example of a process for identifying matching media files.

An example of a technique for determining whether a matching media file exists for an unknown media file (e.g., which may be embodied as media file matching logic 110 of FIG. 1 and/or be part of 204 of FIG. 2) will now be described with reference to FIG. 3. In this example, the unknown media file (i.e., the first media file of FIG. 3) is an audio file selected for playback either by a user or a software application. If available, any metadata associated with the selected audio file is acquired (302). Such metadata associated with audio and video files may be used to quickly narrow the field of search. For example, if metadata of an audio file identifies the musical artist, then the field of search for corresponding video files may be narrowed to include only video files corresponding to that artist as identified by metadata associated with the video files. The search for possible matches could be further narrowed if both the artist and track are identified in the respective metadata, and so on.

The digital signature for the selected audio file is acquired (304). This may be accomplished with a real-time generation of the digital signature as discussed above. Alternatively, the digital signature for the audio file may be retrieved from an existing repository (e.g., media file data store 114 of content service 102, or a separate data store associated with another service provider) using metadata associated with the audio file. Metadata associated with the audio file may also be used to identify any possible matching video files (306) with reference to metadata associated with the video files, e.g., metadata identifying the same artist, song title, etc. Any matching video files are identified based on a comparison between the digital signature of the audio file and the digital signatures associated with the video files (308). This comparison may be done in real time, or may be based on a previous comparison and match as represented, for example, by a pointer from one file to the other, or from one digital signature to the other.

Metadata associated with media files may also be leveraged to deal with situations in which digital signatures for both unknown and known files are generated in response to selection of the unknown file for playback. For example, as discussed above, the digital signature for an audio file may be generated when the user selects the audio file for playback. Digital signatures for any potentially matching video files (e.g., identified using associated metadata) may also be generated on the fly to determine whether an actual match exists. Because the pool of possible matching candidates can be greatly reduced using metadata, a transition between an audio and video file may still be efficiently accomplished even where no digital signatures previously existed.

Identification of the transition points to enable transition between playback of the audio file and playback of the video file (e.g., as accomplished by playback transition logic 113) may be done using the data points of the respective digital signatures. That is, because the data points of the digital signatures are temporally localized, matching data points can be assumed to map to the same or nearby points in time in the playback of the respective files. Therefore, once a match has been identified, matching data points in the respective files that are ahead of the current playback point of the audio file can be selected to facilitate the transition. As will be understood, in cases where the digital signature of the audio file is being generated on the fly, this may require some buffering of the audio samples of the audio file and/or the data points of the digital signature to enabling "looking ahead" of the current playback.

The granularity with which transition points may be identified may vary with different implementations. For example, transition points may be identified and allowed to occur at or near the temporal resolution of the data points of the matching digital signatures. In this way, the transition from one file to the other may be nearly instantaneous and exact. Alternatively, transition points may be spaced further apart, e.g., every few seconds, in which case, when the user elects to watch the video, the next available transition point is used. Any delay that is perceptible to the user that might be a source of confusion or frustration may be dealt with by communicating to the user that the selected video is loading.

In cases in which the digital signatures are generated ahead of time, transition points may also be identified ahead of time to further reduce latency during real-time operation. Identifying transition points ahead of time may also serve to improve the seamlessness of the transition between the audio of the audio file playback and that of the video file playback in that the matching between the points can be made with higher confidence and a higher degree of precision than matching done on the fly.

In another alternative, if an exact signature match is found or it is otherwise known that the audio file and the audio component of the video file are substantially identical, time stamps associated with the playback of each may be used. That is, assuming there is a high confidence that the audio is substantially identical between the two files, and assuming that the audio component of the video file starts at the beginning of the video file (or the temporal offset is known), it can be assumed that the playback times of the matching files are substantially identical, and therefore that the time stamps in the playback of the two files may be used. For example, playback of the video file could begin and playback of the audio file could terminate at the 1:26 time stamp of each file.

As alluded to above, account may need to be taken of any offset or difference in the starting time of the audio within the respective files. For example, if the matching audio component of a video file starts 14 seconds after the video file begins, this offset will need to be included when identifying the transition point between the files. In general, the use of time stamps could provide efficiency where, for example, libraries of digital signatures for both audio and video files exist ahead of time.

Figure 4:
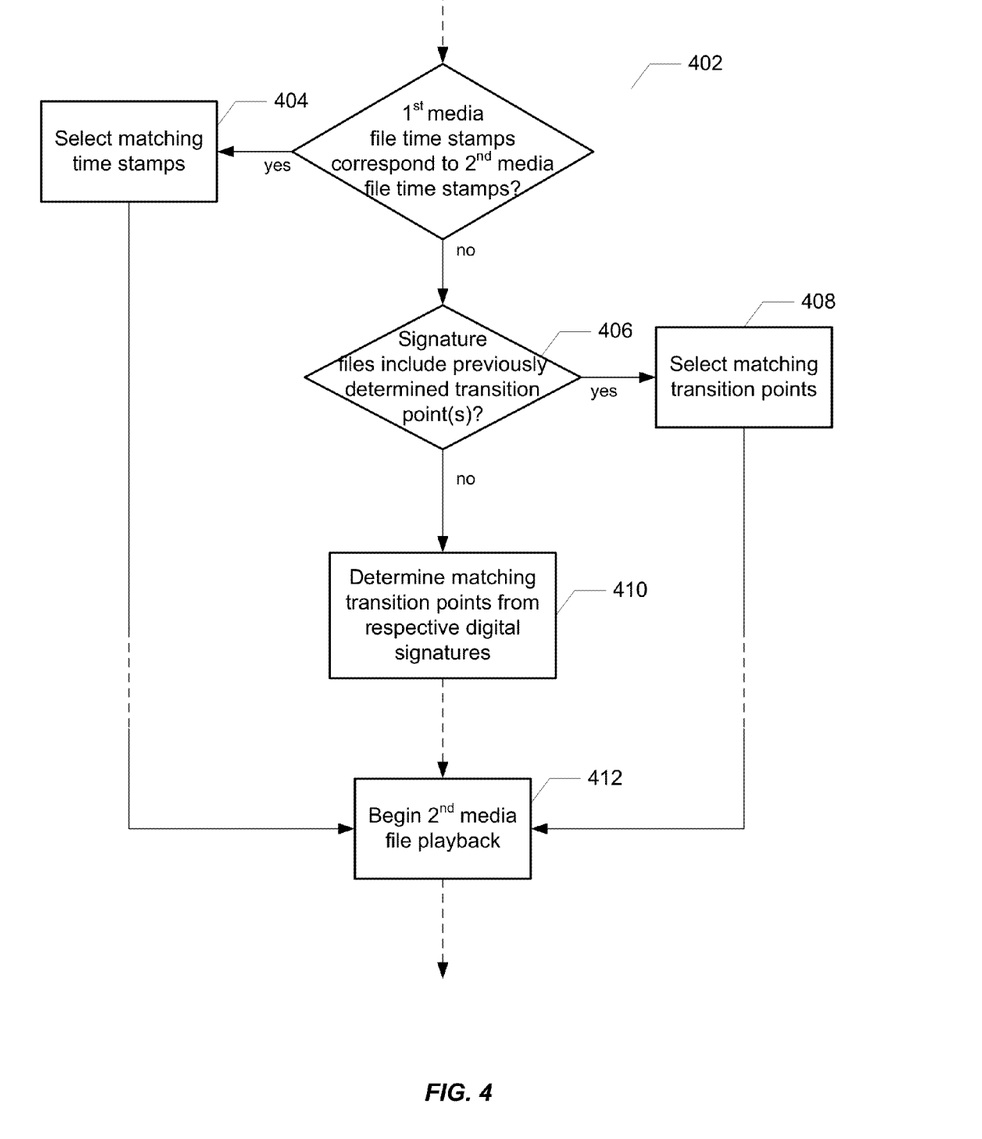
FIG. 4 illustrates an example of a process for identifying transition points for transitioning between playback of media files.

FIG. 4 illustrates an example of a technique for identifying playback transition points in matching media files (e.g., as embodied by playback transition logic 113 of FIG. 1 and/or as part of 210 of FIG. 2) that combines these approaches. As will be understood, implementations are also contemplated in which only one or two of the depicted alternatives are employed.

Where it is known that the time stamps of the audio file (the first media file of FIG. 4) correspond to the time stamps of the matching video file (the second media file of FIG. 4) (402), matching time stamps are selected from each file for terminating playback of the audio file and beginning playback of the video file (and its corresponding audio track), respectively (404). If the correspondence between time stamps is not known or available, it is determined whether the digital signature files have associated transition points that were previously determined (406) and, if so, matching transition points are selected from among the previously determined points (408). It should be noted that, where the transition points for the respective files were generated independently of each other, the temporal correspondence of the transition points of one file might not be perfectly matched to those of the other, in which case some mitigation may need to be performed to smooth the transition.

If correspondence between time stamps is not known or available, and if transition points have not been previously determined, one or more pairs of matching transition points may be determined from the respective digital signatures as described above (410). Playback of the video file (and its corresponding audio track) is then commenced (and playback of the audio file terminated) at the determined transition point (412).

It should be noted that a match between an audio file and the audio component of a video file does not require that the digital signatures of the respective files themselves match perfectly or in their entirety. Rather, implementations are contemplated in which digital signatures generated on the fly may be degraded relative to previously generated digital signatures stored in a data store, or may only include a small portion of a corresponding audio component of a matching video file. However, as long as the digital signatures match with a sufficient confidence level and over some reasonable time duration in which a suitable transition point can be identified, a transition may be made from playback of the audio file to playback of the matching video file.

This flexibility also allows for situations in which the audio component of the video file includes additional audio information, e.g., before or after the audio information that matches the audio file being played. For example, the video file could include a sequence of music videos from the same artist, or even multiple artists. As long as the transition from the audio file to the video file occurs within the window during which the audio is substantially the same, the transition may be relatively seamless and the user may simply experience any subsequent audio associated with the video file as a bonus.

In another example, presenting the user with the option of switching from one media file to another may only make sense during an initial period of playback of the first media file (e.g., the first minute). After that, it may reasonably be assumed that the user is not interested. In such a scenario, the digital signatures of the media files stored in the media file data store might only need to represent the first minute of their respective audio components, thus representing a further efficiency.

Various implementations may be advantageous in that they may be independent of the codecs in which the respective media files encode their content. That is, digital signatures of media files that are suitable for use as described herein may be generated from the decoded content, e.g., from the decoded audio during playback. It is possible, therefore, to transition from playback of a media file encoded in one format to playback of a media file encoded in another.

According to one class of implementations, the ability to transition between media files as described herein may be implemented in the context of a single media player. That is, as the media player is playing a selected audio file it can be communicating with the back end to facilitate identification of a matching video file that is then made available via the same media player. Alternatively, implementations are contemplated that can switch between media players. For example, while one media player is playing the audio file, another application operating on the same device, e.g., another media player or a background utility, recognizes or acquires the signature of the audio file that is being played, and either launches another media player for transition to playback of a matching video, or plays the matching video itself. Implementations are even contemplated in which the playback of the matching video is provided on another device altogether. For example, playback of the audio file on a user's smart phone might transition to playback of the video file on the user's tablet. And while some of these alternative approaches might be characterized by some latency in switching between media players and/or devices, user frustration or confusion may be mitigated by a communication that the selected video file is loading, along with continued playback of the audio file (e.g., by the first media player or device) until video playback can commence.

According to some implementations, the source of the respective media files may be the same, e.g., where a single entity owns or controls access to both matching media files. Such an arrangement may facilitate various efficiencies such as, for example, the construction of libraries of digital signatures for media files as they are injected into the system, anticipatory identification of matching media files, anticipatory identification of playback transition points, a high level of confidence in the accuracy of file metadata, etc.

Alternatively, the source of the first media file may be different than that of the matching file. For example, a user might be playing an audio file from his own collection using a media player on his home computer or streaming a music track from an online radio station or music subscription service. The media player (or another application) on the user's device could then initiate identification and retrieval of a corresponding video file from a remote repository associated with an online content distribution service, e.g., as represented by data store 114 of content service 102 in FIG. 1, or some other service provider.

As mentioned above, and despite references to implementations in which a transition is effected from playback of an audio file to playback of a matching video file, implementations are contemplated in which the transition may occur in either direction, i.e., from audio to video or from video to audio, or even multiple transitions may occur between two files, e.g., from audio to video and then back to audio. Moreover, transitions may be facilitated between files of the same type, e.g., audio to audio or video to video.

According to an alternative implementation, playback of the original audio file is not terminated. Instead, playback of the video component of the video file may be synchronized with the original audio file playback using the techniques described herein. For example, a matching video file can be identified as described above. Further, a transition point can also be identified as described above based on the respective digital signatures of the audio file and the audio component of the matching video file. The transition point in the audio component of the video file may then be used to identify the corresponding video frame at which to begin playback of the video component of the video file. In such a case, the transition would be characterized simply by the commencement of the video component playback in conjunction with continued playback of the original audio file. Such an approach might be desirable, for example, where the fidelity of the original audio file is considerably greater than that of the audio component of the video file, or where control over the audio file playback is not available (e.g., is under the control of another application).

In addition, such an approach would be advantageous with regard to the possibility that an audio transition might be perceptible to the user as no such transition would be taking place. A possible disadvantage of such an approach might relate to the fact that some video files include additional audio information at some points that are not identical with the audio file, i.e., at some point, the audio would no longer be synchronized with the video. However, this may be avoided by identifying such mismatches, e.g., from examination of the complete signatures of the respective files, or from flag associated with the video file metadata that indicates the potential mismatch.

It should be noted that implementations are contemplated in which various combinations of the techniques described herein may be employed to provide a robust service that covers different use cases. For example, such a system might include existing libraries of digital signatures of media files that can be leveraged to take shortcuts to identifying playback transition points, e.g., use of playback time stamps instead of matching signature data. Such a system might also include the capability of generating digital signatures on the fly (for either or both of the unknown media file and the repository of media files) to capture use cases for which the media files have not previously been processed by the system. Other variations and combinations will be apparent to those of skill in the art.

For example, implementations have been described herein in which the transition between playback of the different media files is substantially imperceptible to the human listener. However, it should be noted that implementations are contemplated in which the transition may not be so seamless. For example, in some cases, the quality of the audio of the two different files may be sufficiently different that the transition, even when timed well, can be detected. In another example, the timing of the transition may not be perfectly matched for any of a variety of reasons, e.g., previously determined transition points in files with matching signatures do not themselves match. In such cases, the effects of a poorly matched transition might be mitigated by, for example, ramping down the volume of the first file playback in conjunction with ramping up the volume of the second file playback.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product for playback of content, comprising one or more non-transitory computer-readable media having computer program instructions stored therein, the computer program instructions being configured such that, when executed, the computer program instructions cause one or more computing devices to:

identify an audio file selected for playback, the audio file including audio content and having a first digital signature and a first playback duration associated therewith;

identify a video file corresponding to the audio file, the video file including an audio component including the same audio content as the audio file and having a second digital signature associated therewith at least a portion of which is substantially identical to the first digital signature, the audio component of the video file also having a second playback duration associated therewith, identification of the video file being based on a comparison of the first and second digital signatures;

provide a selectable option to initiate playback of the video file in response to identification of the video file;

in response to selection of the selectable option, identify a pair of matching transition points associated with the first and second digital signatures during playback of the audio file, the pair of matching transition points including a first data point included in the first digital signature and a second data point included in the second digital signature that matches the first data point; and cause a transition from playback of the audio content included in the audio file to playback of the video file at the matching transition points such that playback of the same audio content included in the video file begins at a point in the second playback duration corresponding to one of the matching transition points that substantially matches a point in the first playback duration corresponding to the other matching transition point at which playback of the audio file ends, and such that a transition of acoustic energy associated with playback of the audio content included in the audio file to acoustic energy associated with playback of the same audio content in the video file is substantially imperceptible to a human listener.

2. The computer program product of claim 1 wherein the first digital signature and the second digital signature include temporally localized data points derived from spectral characteristics of audio samples associated with the audio file and the audio component of the video file, respectively, and wherein the computer program instructions are further configured to cause the one or more computing devices to identify the video file by comparing the first digital signature to a plurality of previously stored media file signatures.

3. The computer program product of claim 1 wherein the computer program instructions are further configured to cause the one or more computing devices to identify the point in the second playback duration and the corresponding point in the first playback duration by identifying one or more pairs of matching transition points associated with the first and second digital signatures during playback of the audio file.

4. A computer-implemented method for playback of content, comprising:

identifying a first media file selected for playback, the first media file including audio content and having a first digital signature and a first playback duration associated therewith;

identifying a second media file corresponding to the first media file, the second media file including the same audio content as the first media file and having a second digital signature associated therewith at least a portion of which is substantially identical to the first digital signature, the second media file also having a second playback duration associated therewith, identification of the second media file being based on a comparison of the first and second digital signatures;

identifying a pair of matching transition points associated with the first and second digital signatures during playback of the first media file, the pair of matching transition points including a first data point included in the first digital signature and a second data point included in the second digital signature that matches the first data point; and causing a transition from playback of the audio content included in the first media file to playback of the same audio content included in the second media file at the matching transition points such that playback of the second media file begins at a point in the second playback duration corresponding to one of the matching transition points that substantially matches a point in the first playback duration corresponding to the other matching transition point at which playback of the first media file ends, and such that a transition of acoustic energy associated with playback of the audio content included in the first media file to acoustic energy associated with playback of the same audio content in the second media file is substantially imperceptible to a human listener.

5. The method of claim 4 wherein the first digital signature and the second digital signature include temporally localized data points derived from spectral characteristics of audio samples associated with the first media file and the second media file, respectively.

6. The method of claim 4 wherein identifying the first media file comprises either or both of generating the first digital signature during playback of the first media file, or identifying the first media file based on metadata associated with the first media file.

7. The method of claim 4 wherein identifying the second media file comprises either comparing the first digital signature to a plurality of previously stored media file signatures, or identifying a previously determined correspondence between the first and second digital signatures.

8. The method of claim 4 further comprising generating one or more media file signatures for a corresponding set of media files during playback of the first media file, wherein identifying the second media file comprises comparing the first digital signature to at least some of the media file signatures to identify the second digital signature.

9. The method of claim 4 further comprising identifying a set of media files including the second media file with reference to metadata associated with the first media file and the set of media files.

10. The method of claim 4 further comprising presenting a selectable option to initiate playback of the second media file in response to identification of the second media file, and causing the transition from playback of the first media file to playback of the second media file in response to selection of the selectable option.

11. The method of claim 4 further comprising identifying the point in the second playback duration and the corresponding point in the first playback duration by identifying one or more pairs of matching transition points associated with the first and second digital signatures during playback of the first media file, or by selecting from among previously identified matching transition points associated with the first and second digital signatures, or with reference to time stamps associated with the first media file and the second media file.

12. The method of claim 4 wherein the first media file comprises a first audio file or a first video file, and the second media file comprises a second audio file or a second video file.

13. A system for playback of content, the system comprising memory and one or more processors configured to:
    identify a first media file selected for playback, the first media file including audio content and having a first digital signature and a first playback duration associated therewith;
    identify a second media file corresponding to the first media file, the second media file including the same audio content as the first media file and having a second digital signature associated therewith at least a portion of which is substantially identical to the first digital signature, the second media file also having a second playback duration associated therewith, identification of the second media file being based on a comparison of the first and second digital signatures;
    identify a pair of matching transition points associated with the first and second digital signatures during playback of the first media file, the pair of matching transition points including a first data point included in the first digital signature and a second data point included in the second digital signature that matches the first data point; and
    cause a transition from playback of the audio content included in the first media file to playback of the same audio content included in the second media file at the matching transition points such that playback of the second media file begins at a point in the second playback duration corresponding to one of the matching transition points that substantially matches a point in the first playback duration corresponding to the other matching transition point at which playback of the first media file ends, and such that a transition of acoustic energy associated with playback of the audio content included in the first media file to acoustic energy associated with playback of the same audio content in the second media file is substantially imperceptible to a human listener.

14. The system of claim 13 wherein the first digital signature and the second digital signature include temporally localized data points derived from spectral characteristics of audio samples associated with the first media file and the second media file, respectively.

15. The system of claim 13 wherein the memory and one or more processors are configured to identify the first media file by either or both of generating the first digital signature during playback of the first media file, or identifying the first media file based on metadata associated with the first media file.

16. The system of claim 13 wherein the memory and one or more processors are configured to identify the second media file by either comparing the first digital signature to a plurality of previously stored media file signatures, or identifying a previously determined correspondence between the first and second digital signatures.

17. The system of claim 13 wherein the memory and one or more processors are further configured to generate one or more media file signatures for a corresponding set of media files during playback of the first media file, and wherein the memory and one or more processors are configured to identify the second media file by comparing the first digital signature to at least some of the media file signatures to identify the second digital signature.

18. The system of claim 13 wherein the memory and one or more processors are further configured to identify a set of media files including the second media file with reference to metadata associated with the first media file and the set of media files.

19. The system of claim 13 wherein the memory and one or more processors are further configured to provide a selectable option to initiate playback of the second media file in response to identification of the second media file, and cause the transition from playback of the first media file to playback of the second media file in response to selection of the selectable option.

20. The system of claim 13 wherein the memory and one or more processors are further configured to identify the point in the second playback duration and the corresponding point in the first playback duration by identifying one or more pairs of matching transition points associated with the first and second digital signatures during playback of the first media file, or by selecting from among previously identified matching transition points associated with the first and second digital signatures, or with reference to time stamps associated with the first media file and the second media file.

21. The system of claim 13 wherein the first media file comprises a first audio file or a first video file, and the second media file comprises a second audio file or a second video file.

* * * * *